US008423494B2

(12) United States Patent
Barrett et al.

(10) Patent No.: US 8,423,494 B2
(45) Date of Patent: Apr. 16, 2013

(54) COMPLEX SITUATION ANALYSIS SYSTEM THAT GENERATES A SOCIAL CONTACT NETWORK, USES EDGE BROKERS AND SERVICE BROKERS, AND DYNAMICALLY ADDS BROKERS

(75) Inventors: Christopher L. Barrett, Blacksburg, VA (US); Madhav V. Marathe, Blacksburg, VA (US); Keith R. Bisset, Eggleston, VA (US); Richard J. Beckman, Blacksburg, VA (US); Paula E. Stretz, Blacksburg, VA (US); Henning S. Mortveit, Blacksburg, VA (US); Stephen G. Eubank, Blacksburg, VA (US); Achla Marathe, Blacksburg, VA (US); Anil Kumar S. Vullikanti, Blacksburg, VA (US)

(73) Assignee: Virginia Polytechnic Institute and State University, Blacksburg, VA (US)

( * ) Notice: Subject to any disclaimer, the term of this patent is extended or adjusted under 35 U.S.C. 154(b) by 443 days.

(21) Appl. No.: 12/760,126

(22) Filed: Apr. 14, 2010

(65) Prior Publication Data

US 2010/0293123 A1 Nov. 18, 2010

Related U.S. Application Data

(60) Provisional application No. 61/169,570, filed on Apr. 15, 2009, provisional application No. 61/323,748, filed on Apr. 13, 2010.

(51) Int. Cl.
*G06F 17/00* (2006.01)

(52) U.S. Cl.
USPC .......................................... 706/45; 705/319

(58) Field of Classification Search ............... 706/12, 706/45, 62; 705/319
See application file for complete search history.

(56) References Cited

U.S. PATENT DOCUMENTS

| | | | |
|---|---|---|---|
| 2004/0088392 A1* | 5/2004 | Barrett et al. | 709/223 |
| 2006/0010029 A1* | 1/2006 | Gross | 705/10 |
| 2006/0242610 A1 | 10/2006 | Aggarwal | |
| 2008/0104225 A1* | 5/2008 | Zhang et al. | 709/224 |
| 2009/0037351 A1 | 2/2009 | Kristal et al. | |
| 2010/0076814 A1* | 3/2010 | Manning | 705/10 |
| 2010/0094939 A1* | 4/2010 | Cheng et al. | 709/206 |
| 2012/0137367 A1* | 5/2012 | Dupont et al. | 726/25 |

OTHER PUBLICATIONS

Barrett, C.L. et al., Generation and Analysis of Large Synthetic Social Contact Networks, In: Proceedings of the 2009 IEEE Winter Simulation Conference, Dec. 16, 2009, pp. 1003-1014.

(Continued)

*Primary Examiner* — David Vincent
(74) *Attorney, Agent, or Firm* — Foley & Lardner LLP

(57) ABSTRACT

A system for generating a representation of a situation is disclosed. The system comprises one or more computer-readable media including computer-executable instructions that are executable by one or more processors to implement a method of generating a representation of a situation. The method comprises receiving input data regarding a target population. The method further comprises constructing a synthetic data set including a synthetic population based on the input data. The synthetic population includes a plurality of synthetic entities. Each synthetic entity has a one-to-one correspondence with an entity in the target population. Each synthetic entity is assigned one or more attributes based on information included in the input data. The method further comprises receiving activity data for a plurality of entities in the target population.

14 Claims, 11 Drawing Sheets

OTHER PUBLICATIONS

Eno, J. et al., Generating Synthetic Data to Match Data Mining Patterns, Internet Computing, IEEE Computer Society, vol. 12, No. 3, Jan. 30, 2008, pp. 78-82.

Lin, P.J. et al., Development of a synthetic data set generator for building and testing information discovery systems, In: Information Technology: ITNG'06, 3rd International Conference on Information Technology: New Generations, IEEE Computer Society, Apr. 12, 2006, 6 pages.

Macià, N., et al., Preliminary Approach on Synthetic Data Sets Generation based on Class Separability Measure, In: Pattern Recognition, 19th International Conference on IEEE, Dec. 11, 2008, 4 pages.

International Search Report and Written Opinion for International Application No. PCT/US2010/030987, mail date Nov. 15, 2010, 9 pages.

* cited by examiner

COMPLEX SITUATION ANALYSIS SYSTEM THAT GENERATES A SOCIAL CONTACT NETWORK, USES EDGE BROKERS AND SERVICE BROKERS, AND DYNAMICALLY ADDS BROKERS

CROSS-REFERENCE TO RELATED PATENT APPLICATIONS

This application claims the benefit of U.S. Provisional Application No. 61/169,570, filed Apr. 15, 2009, and entitled "Complex Situation Analysis and Support," and U.S. Provisional Application No. 61/323,748, filed Apr. 13, 2010, and entitled "Situation Analysis System," both of which are hereby incorporated by reference.

BACKGROUND

The present disclosure relates generally to the field of computer science. More particularly, the present disclosure relates to computer modeling of interactions among multiple entities.

Computer-generated models are frequently used to replicate various real-life scenarios. Such models, for example, may be used to model traffic congestion in a particular area during a particular time of day. Using these models, researchers can estimate the effect that a change in certain variables related to the models may have on the outcome of the scenarios being replicated.

Computer models may be limited in their usefulness by various factors, including the availability of information with which to construct the network underlying the model. Social contact networks are a type of network representing interactions between entities within a population. Large-scale social contact networks may be particularly complicated to model because of the difficulty in collecting reliable data regarding entities and social contacts within the population. Some social contact network models have addressed this difficulty by utilizing only small data sets in constructing the social contact network. In some types of network models (e.g., the Internet, the power grid, etc.), where the real network structure is not easily available due to commercial and security concerns, methods have been developed to infer the network structure by indirect measurements. However, such methods may not apply to large-scale social contact networks (e.g., large heterogeneous urban populations) because of the variety of information sources needed to build them.

SUMMARY

One embodiment of the disclosure relates to a system. The system comprises one or more computer-readable media including computer-executable instructions that are executable by one or more processors to implement a method of generating a representation of a situation. The method comprises receiving input data regarding a target population. The method further comprises constructing a synthetic data set including a synthetic population based on the input data. The synthetic population includes a plurality of synthetic entities. Each synthetic entity has a one-to-one correspondence with an entity in the target population. Each synthetic entity is assigned one or more attributes based on information included in the input data. The method further comprises receiving activity data for a plurality of entities in the target population. The method further comprises generating activity schedules for each synthetic entity in the synthetic population. Each synthetic entity is assigned at least one activity schedule based on the attributes assigned to the synthetic entity and information included in the activity data. An activity schedule describes the activities of the synthetic entity and includes a location associated with each activity. The method further comprises receiving additional data relevant to the situation being represented. The additional data is received from at least two distinct information sources. The method further comprises modifying the synthetic data set based on the additional data. Modifying the synthetic data set includes integrating at least a portion of the additional data received from each of the at least two distinct information sources into the synthetic data set based on one or more behavioral theories related to the synthetic population. The method further comprises generating a social contact network based on the synthetic data set. The social contact network is used to generate the representation of the situation.

Another embodiment of the disclosure relates to a program product. The program product comprises one or more computer-readable media including computer-executable instructions that are executable by one or more processors to implement a method of generating a representation of a situation. The method comprises receiving input data regarding a target population. The method further comprises constructing a synthetic data set including a synthetic population based on the input data. The synthetic population includes a plurality of synthetic entities. Each synthetic entity has a one-to-one correspondence with an entity in the target population. Each synthetic entity is assigned one or more attributes based on information included in the input data. The method further comprises receiving activity data for a plurality of entities in the target population. The method further comprises generating activity schedules for each synthetic entity in the synthetic population. Each synthetic entity is assigned at least one activity schedule based on the attributes assigned to the synthetic entity and information included in the activity data. An activity schedule describes the activities of the synthetic entity and includes a location associated with each activity. The method further comprises receiving additional data relevant to the situation being represented. The additional data is received from at least two distinct information sources. The method further comprises modifying the synthetic data set based on the additional data. Modifying the synthetic data set includes integrating at least a portion of the additional data received from each of the at least two distinct information sources into the synthetic data set based on one or more behavioral theories related to the synthetic population. The method further comprises generating a social contact network based on the synthetic data set. The social contact network is used to generate the representation of the situation.

Yet another embodiment of the disclosure relates to a system. The system comprises one or more computer-readable media including computer-executable instructions that are executable by one or more processors to implement one or more software modules. The modules comprise a surveillance subsystem configured to receive input data regarding a target population. The modules further comprise a synthetic data set subsystem configured to construct a synthetic data set including a synthetic population based on the input data. The synthetic population includes a plurality of synthetic entities. Each synthetic entity has a one-to-one correspondence with an entity in the target population. Each synthetic entity is assigned one or more attributes based on information included in the input data. The surveillance subsystem is configured to receive activity data for a plurality of entities in the target population. The synthetic data set subsystem is configured to generate activity schedules for each synthetic entity in the synthetic population. Each synthetic entity is assigned at least one activity schedule based on the attributes assigned to the synthetic entity and information included in the activity data. An activity schedule describes the activities of the synthetic entity and includes a location associated with each activity. The surveillance subsystem is configured to receive additional data relevant to the situation being represented. The additional data is received from at least two distinct information sources. The synthetic data set subsystem is configured to modify the synthetic data set based on the additional data. Modifying the synthetic data set includes integrating at least a portion of the additional data received from each of the at least two distinct information sources into the synthetic data set based on one or more behavioral theories related to the synthetic population. The synthetic data set subsystem is configured to generate a social contact network based on the synthetic data set. The social contact network is used to generate the representation of the situation.

DETAILED DESCRIPTION

Referring generally to the Figures, a situation analysis system for representing complex systems is shown and described, according to various exemplary embodiments. The situation analysis system is configured to build a synthetic data set including a synthetic population representing a target population of interest in an experiment. A synthetic population may be a collection of synthetic entities (e.g., humans, plants, animals, insects, cells within an organism, etc.), each of which represents an entity in a target population in an abstract fashion such that the actual entity in the target population is not individually identifiable (e.g., for anonymity and/or security purposes) but the structure (e.g., time-varying interaction structure) and properties (e.g., statistical properties) of the target population are preserved in the synthetic population. The situation analysis system is configured to modify the synthetic data set to include information regarding interactions between synthetic entities that are members of the synthetic population. The synthetic data set can be used to generate a social contact network (e.g., represented as a graph) representing a situation associated with the experiment, which can in turn be used to analyze different decisions and courses of action that may be made in relation to the experiment. The situational analysis system may allow a user to efficiently study very large interdependent societal infrastructures (e.g., having greater than 10 million interacting elements) formed by the interaction between infrastructure elements and the movement patterns of entities in the population of interest.

Figure 1:
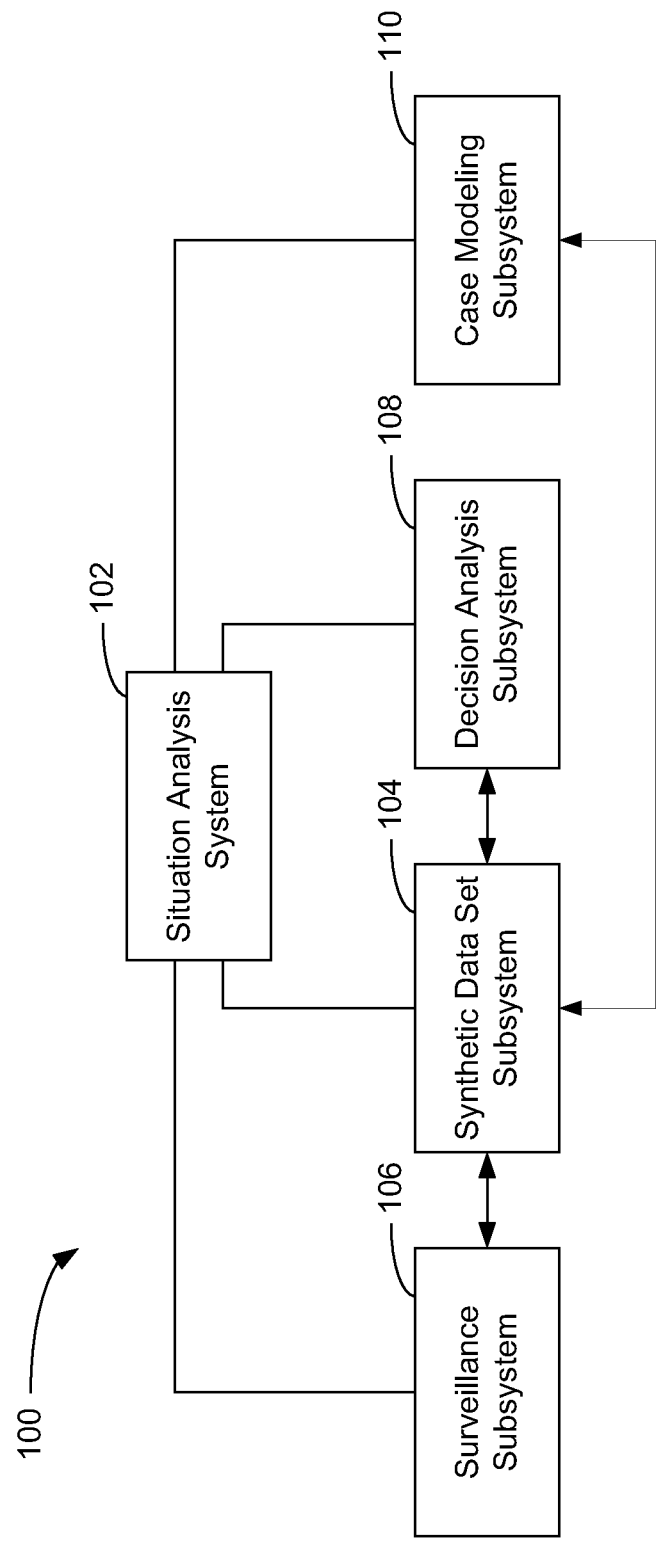
FIG. 1 illustrates an organizational chart for a situation analysis system, according to an exemplary embodiment.

Referring now to FIG. 1, an organizational chart 100 for a situation analysis system 102 is shown, according to an exemplary embodiment. Situation analysis system 102 is an integrated system for representation and support of complex situations. System 102 is configured to construct a synthetic data set including a synthetic population representing an actual population of interest and utilize various data sources (e.g., surveillance data, simulations, expert opinions, etc.) to construct a hypothetical representation of a situation. System 102 can then use simulation-based methods to determine outcomes consistent with the hypothesis and use the determined outcomes to confirm or disprove the hypothesis. In various embodiments, system 102 may be configured to create representations of a situation (e.g., involving a large-scale urban infrastructure) involving a large number of interacting entities (e.g., at least ten million interacting entities). In some embodiments, system 102 may be scalable to represent interactions between 100-300 million or more interacting entities and five to fifteen billion interactions.

According to various embodiments, system 102 may be implemented as software (e.g., computer-executable instructions stored on one or more computer-readable media) that may be executed by one or more computing systems. System 102 may be implemented across one or more high-performance computing ("HPC") systems (e.g., a group of two or more computing systems arranged or connected in a cluster to provide increased computing power). In some embodiments, system 102 may be implemented on HPC architectures including 20,000 to 100,000 or more core systems. System 102 may be implemented on wide-area network based distributed computing resources, such as the TeraGrid or the cloud. In further embodiments, one or more components of system 102 may be accessible via mobile communication devices (e.g., cellular phones, PDAs, smartphones, etc.). In such embodiments, the mobile communication devices may be location-aware and one or more components of system 102 may utilize the location of the digital device in creating the desired situation representation.

In the exemplary embodiment of FIG. 1, situation analysis system 102 is shown to include several subsystems. Synthetic data set subsystem 104 is configured to construct a synthetic population based on an actual population of interest for the situation being represented. Throughout much of the present disclosure, the synthetic population is discussed as representing a population of human beings in a particular geographic area. However, it should be appreciated that, according to various embodiments, the synthetic population may represent other types of populations, such as other living organisms (e.g., insects, plants, etc.) or objects (e.g., vehicles, wireless communication devices, etc.). Synthetic data set subsystem 104 may be used to represent populations including hundreds of millions to billions of interacting entities or individuals. Once a synthetic population has been constructed, synthetic data set subsystem 104 may utilize data from one or more different data sources to construct a detailed dynamic representation of a situation. The data sources utilized in constructing the representation may be dependent upon the situation being analyzed.

Surveillance subsystem 106 is configured to collect and process sensor and/or surveillance information from a variety of information sources (e.g., surveillance data, simulations, expert opinions, etc.) for use in creating and/or modifying the synthetic data set. The data may be received from both proprietary (e.g., commercial databases, such as those provided by Dun & Bradstreet) and publicly available sources (e.g., government databases, such as the National Household Travel Survey provided by the Bureau of Transportation Statistics or databases provided by the National Center for Education Statistics). Surveillance subsystem 106 may be used to integrate and/or classify data received from diverse information sources (e.g., by the use of voting schemes). Standard classification schemes used in machine learning and statistics (e.g., Bayes classifiers, classification and regression trees, principal components analysis, support vector machines, clustering, etc.) may be used by surveillance subsystem 106 depending on the desired application. In some embodiments, surveillance subsystem 106 may allow the flexibility to utilize new techniques developed for a specific application. The data collected and processed by surveillance subsystem 106 may be used by synthetic data set subsystem 104 and/or other subsystems of system 102 to create, modify and/or manipulate the synthetic data set and, accordingly, the situation representation. Synthetic data set subsystem 104 may in turn provide cues to surveillance subsystem 106 for use in orienting surveillance and determining what data should be obtained and/or how the data should be processed.

Decision analysis subsystem 108 is configured to analyze various possible courses of action and support context-based decision making based on the synthetic data set, social contact network and/or situation representation created by synthetic data set subsystem 104. Decision analysis subsystem 108 may be used to define a scenario and design an experiment based on various alternatives that the user wishes to study. The experiment design is utilized by the other subsystems of system 102, including synthetic data set subsystem 104, to build and/or modify the synthetic data set (including, e.g., the synthetic population) and construct the social contact network used to represent the situation. Decision analysis subsystem 108 uses information related to the synthetic data set and/or situation representation received from synthetic data set subsystem 104 to support decision making and analysis of different possible courses of action. Experiment design, decision making, analysis of alternatives, and/or other functions of decision analysis subsystem 108 may be performed in an automated fashion or based on interaction with and input from one or more users of system 102.

In some embodiments, various subsystems of system 102 may utilize one or more case-specific models provided by case modeling subsystem 110. Case modeling subsystem 110 is configured to provide models and/or algorithms based upon the scenario at issue as defined by decision analysis subsystem 108. According to various embodiments, exemplary case models may be related to public health (e.g., epidemiology), economics (e.g., commodity markets), computing networks (e.g., packet switched telecommunication networks), civil infrastructures (e.g., transportation), and other areas. In some embodiments, portions of multiple case models may be used in combination depending on the situation the user desires to represent.

Figure 2A:
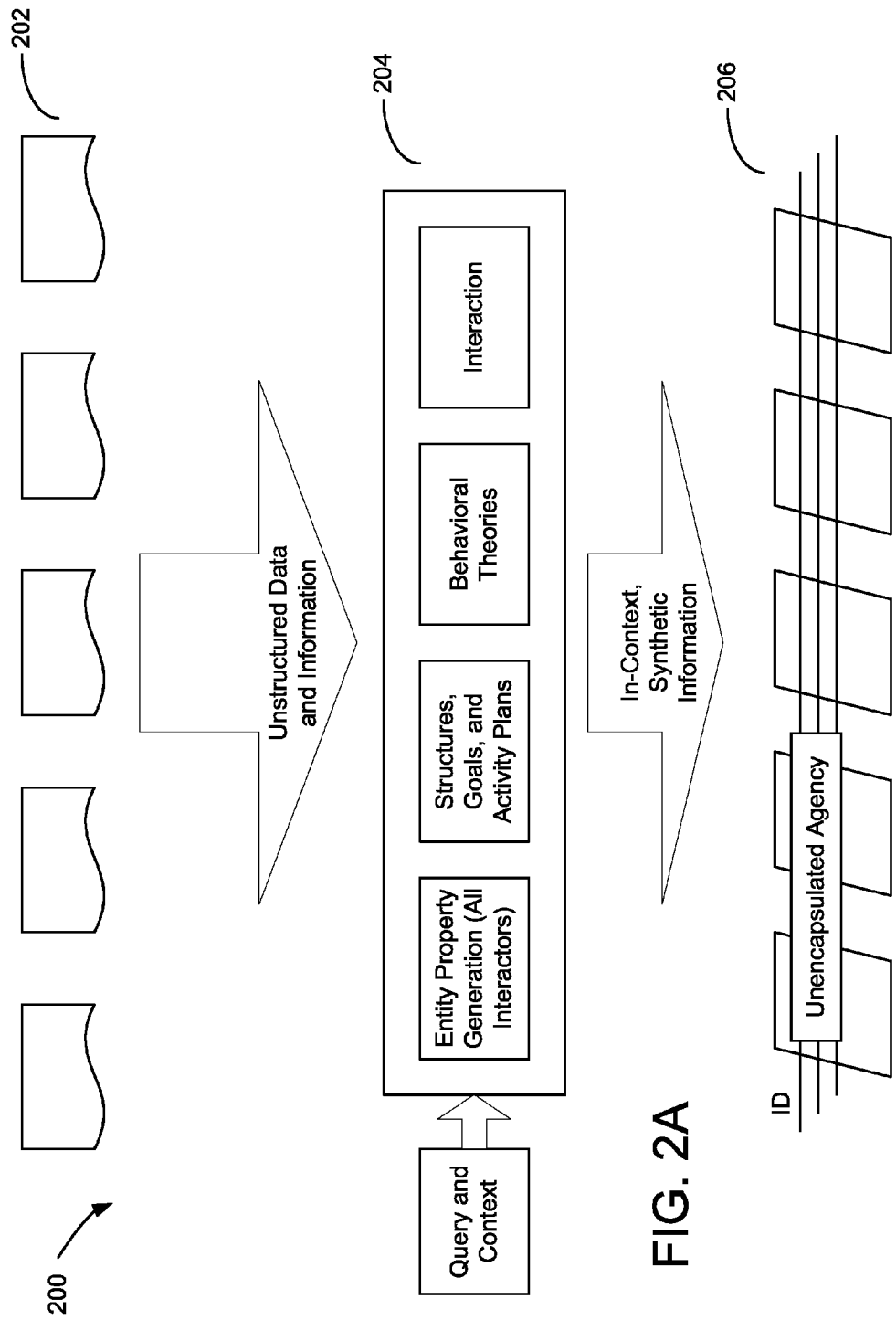
FIG. 2A illustrates a flow diagram showing the flow and structure of information using the situation analysis system, according to an exemplary embodiment.

Referring now to FIG. 2A, a flow diagram illustrating the flow and structure of information using system 102 is shown, according to an exemplary embodiment. At block 202, unstructured data is collected by surveillance subsystem 106 for use in forming the desired situation representation. The data may be collected from various proprietary and/or public sources, such as surveys, government databases, proprietary databases, etc. Surveillance subsystem 106 processes the information into a form that can be utilized by synthetic data set subsystem 104.

At block 204, synthetic data set subsystem 104 receives the unstructured data, provides context to the data, and creates and/or modifies a synthetic data set, including a synthetic population data set, and constructs a social contact network used to form the desired situation representation. Synthetic data set subsystem 104 may provide context to the unstructured data using various modules that may be based on, for example, properties of the individuals or entities that comprise the synthetic population, previously known goals and/or activities of the members of the synthetic population, theories regarding the expected behavior of the synthetic population members, known interactions between the synthetic population members, etc. In some embodiments, unstructured data obtained from multiple sources may be misaligned or noisy and synthetic data set subsystem 104 may be configured to use one or more behavioral or social theories to combine the unstructured data into the synthetic data set. In various embodiments, synthetic data set subsystem 104 may be configured to contextualize information from at least ten distinct information sources. Synthetic data set subsystem 104 may be configured to construct multi-theory networks, such that synthetic data set subsystem 104 includes multiple behavioral rules that may be utilized by various components of synthetic data set subsystem 104 to construct and/or modify the synthetic data set depending on the situation being represented and the types of interactions involved (e.g., driving behavior, disease manifestation behavior, wireless device use behavior, etc.). Synthetic data set subsystem 104 may also be configured to construct multi-level networks, such that separate types of social contact networks (e.g., transportation networks, communications networks) may be created that relate to distinct types of interactions but are coupled through common synthetic entities and groups. Because context is provided to the unstructured information through the use of behavioral theories and other factors, in some embodiments synthetic data set subsystem 104 may be configured to incorporate information from new data sets into the synthetic data set as they become available for use by system 102. For example, synthetic data set subsystem 104 may be configured to incorporate usage data regarding new wireless communication devices.

Once context has been provided to the unstructured data, the relevant data is integrated into the synthetic data set, which is provided by situational awareness module 104 at block 206. According to various embodiments, the synthetic data set provided at block 206 may be modified (e.g., iteratively) to incorporate further data from surveillance subsystem 106, for example based on experiment features or decisions provided by decision analysis subsystem 108. As further questions are posed via decision analysis subsystem 108 and further data is integrated into the synthetic data set, system 102 may require less computing resources to produce a desired situation representation. In some embodiments, the synthetic information resource may be stored or preserved and utilized (e.g., by the same or a different user of system 102) to form representations of other (e.g., similar) situations. In such embodiments, less computing resources may be required to create the newly desired situation representation as one or more types of information needed to create the representation may already be incorporated into the previously created synthetic data set.

Figure 2B:
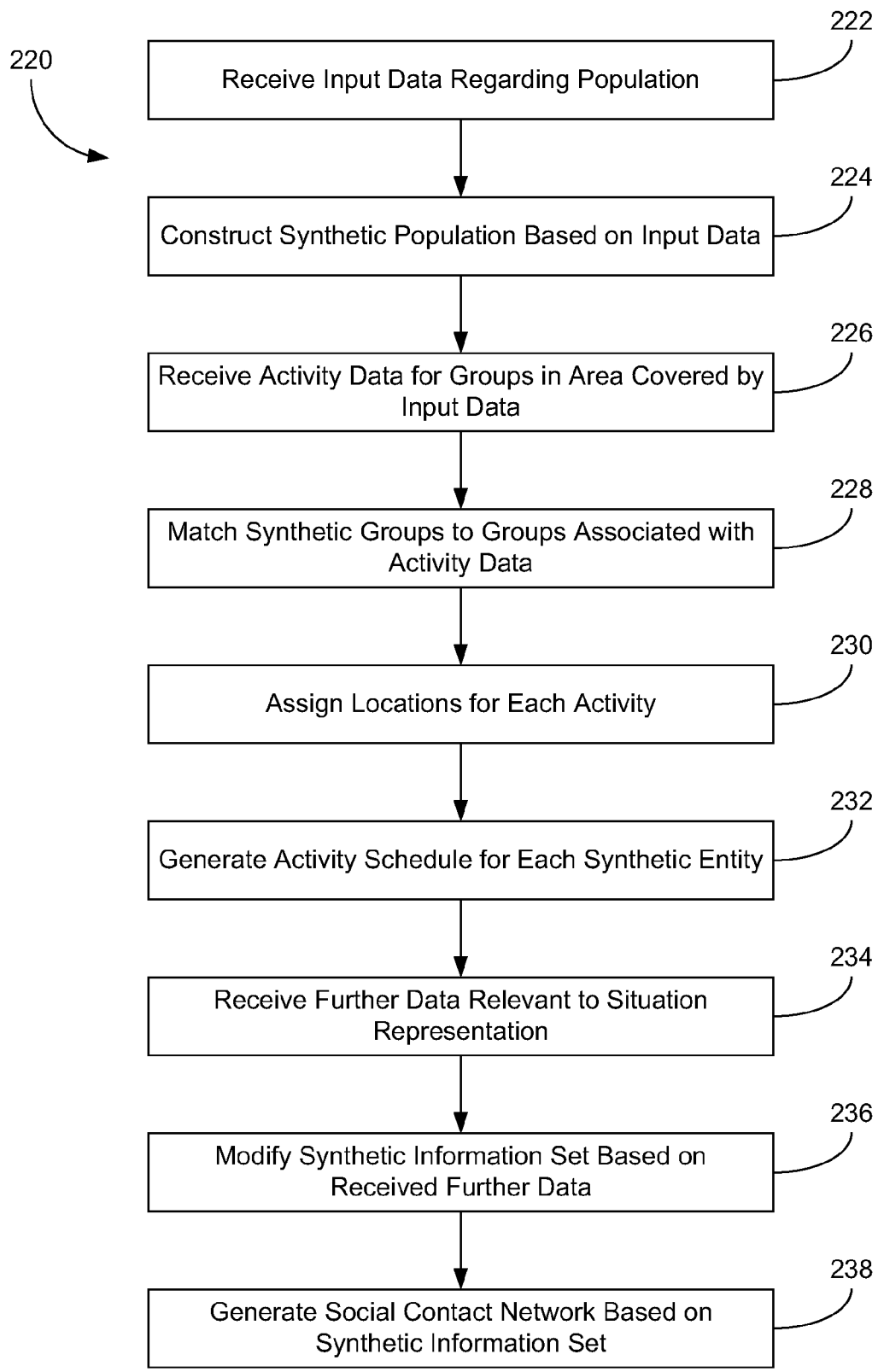
FIG. 2B illustrates a flow diagram of a process that may be used by the situation analysis system to construct a synthetic population, according to an exemplary embodiment.

Referring now to FIG. 2B, a flow diagram of a process 220 that may be used by system 102 to construct a synthetic data set. At step 222, system 102 receives input data regarding a target population of interest in forming the desired situation representation. For example, if the desired situation representation relates to the spread of an illness in Illinois, the input data may include information regarding people living in or near the state of Illinois. The input data may be collected by surveillance subsystem 106 and processed for use by synthetic data set subsystem 104. The input data may be any of various types of data received from public and/or proprietary sources. For the purposes of this exemplary embodiment, the input data is data from the U.S. Census.

Synthetic data set subsystem 104 uses the input data to construct a synthetic population based on the received input data (step 224). The synthetic population includes a plurality of interacting synthetic entities, which may be living organisms (e.g., humans, animals, insects, plants, etc.) and/or inanimate objects (e.g., vehicles, wireless communication devices, infrastructure elements, etc.). In some embodiments, the synthetic population may model all entities within an area (e.g., geographic area) of interest, such that each synthetic entity in the synthetic population represents an actual entity in the location (e.g., geographic location) of interest. The synthetic entities may be assigned characteristics based on information reflected in the input data. In the example noted above, wherein the synthetic entities represent human beings and the input data is data from the U.S. Census, the demographic data reflected in the U.S. Census may be used to generate the synthetic population (e.g., age, income level, etc.).

The synthetic entities may also be placed in one or more blocks or groups with other synthetic entities. For example, synthetic entities representing human beings may be placed in households with other synthetic entities based on the census data. The households may be placed geographically in such a way that the synthetic population reflects the same statistical properties as the underlying census data (i.e., the synthetic population is statistically indistinguishable from the census data). Because the synthetic population is composed of synthetic entities created using census demographic data and not actual entities or individuals, the privacy and security of the actual entities within the population of interest can be protected. In other embodiments, the synthetic entities may be grouped into other types of synthetic blocks or groups based on characteristics other than household membership (e.g., genus, species, device type, infrastructure type, etc.). In some embodiments, a synthetic data set may not previously exist and synthetic data set subsystem 104 may create a new synthetic data set including the constructed synthetic population. In other embodiments, a previously existing synthetic data set may be modified to include part or all of the created synthetic population.

System 102 may also obtain or receive a set of activity or event templates including activity data for entities or groups of entities in the target population (step 226). For example, activity templates related to a human population may include activity data for households in the geographic area of interest. The activity templates may be based on information from one or more sources, such as travel surveys collected by the government, marketing surveys (e.g., proprietary surveys conducted by marketing agencies), digital device tracking data (e.g., cellular telephone or wireless communication device usage information), and/or other sources. The activity data may be collected and processed by surveillance subsystem 106 and used by synthetic data set subsystem 104 to construct or modify a social contact network based on the synthetic population. In some embodiments, data may be collected from multiple sources, which may or may not be configured to be compatible with one another, and surveillance subsystem 106 and/or synthetic data set subsystem 104 may be configured to combine and process the data in a way that may be used by synthetic data set subsystem 104 to create and/or modify the synthetic data set. The activity templates may describe daily activities of the inhabitants of the household and may be based on one or more information sources such as activity or time-use surveys. The activity templates may also include data regarding the times at which the various daily activities are performed, priority levels of the activities, preferences regarding how the entity travels to the activity location (e.g., vehicle preference), possible locations for the activity, etc. In some embodiments, an activity template may describe the activities of each full day (i.e., 24 hours) for each inhabitant of the associated household in minute-by-minute or second-by-second detail.

Once the activity templates are received, synthetic data set subsystem 104 matches each synthetic group (e.g., household) with one of the survey groups (e.g., survey households) associated with the activity templates (step 228). The synthetic groups may be matched with survey groups (e.g., using a decision tree) based on information (e.g., demographic information) contained in the input data (e.g., census data) and information from the activity surveys (e.g., number of workers in the household, number of children in the household, ages of inhabitants, etc.). Synthetic data set subsystem 104 then assigns each synthetic group the activity template of its matching survey group.

Once activity templates have been assigned to each synthetic group, a location is assigned for each synthetic group and each activity reflected in the synthetic group's activity template (step 230). The locations may be assigned based on observed land-use patterns, tax data, employment data, and/or other types of data. Locations may be assigned in part based on an identity or purpose of the activity, which, in the example where the synthetic population represents a human population, may include home, work, school or college, shopping, and/or other identities. Locations for the activities may be chosen using data from a variety of databases, including commercial and/or public databases such as those from Dun & Bradstreet (e.g., for work, retail, and recreation locations) and the National Center for Educational Statistics (e.g., for school and college locations). In some embodiments, the locations may be calibrated against observed travel-time distributions for the relevant geographic area. For example, travel time data in the National Household Travel Survey may be used to calibrate locations. Once locations for each activity have been determined, an activity schedule is generated for each synthetic entity describing the activities of the synthetic entity, including times and locations (step 232). The activity templates and/or activity schedule may be based in part on the experiment and/or desired situation representation. The synthetic data set may be modified to include the activity schedules, including locations.

In some embodiments, system 102 may be configured to receive further data based on the desired situation representation (step 234). Referring to the example above, if the desired situation representation is related to spread of an illness in Illinois, the further data may include information regarding what areas of Illinois have recorded infections, what the level of infection is in those areas, etc. The received further data may be used to modify, or add information to, the synthetic data set (step 236). In various embodiments, steps 234 and 236 may be repeated one or more times (e.g., iteratively) to integrate additional information that is relevant to the desired situation representation into the synthetic data set. At step 238, a social contact network (e.g., represented as a graph) may be created based on the entities and interactions reflected in the synthetic data set. The resultant social contact network can be used to model the desired situation representation such that appropriate decisions can be made using decision analysis subsystem 108.

Figure 2C:
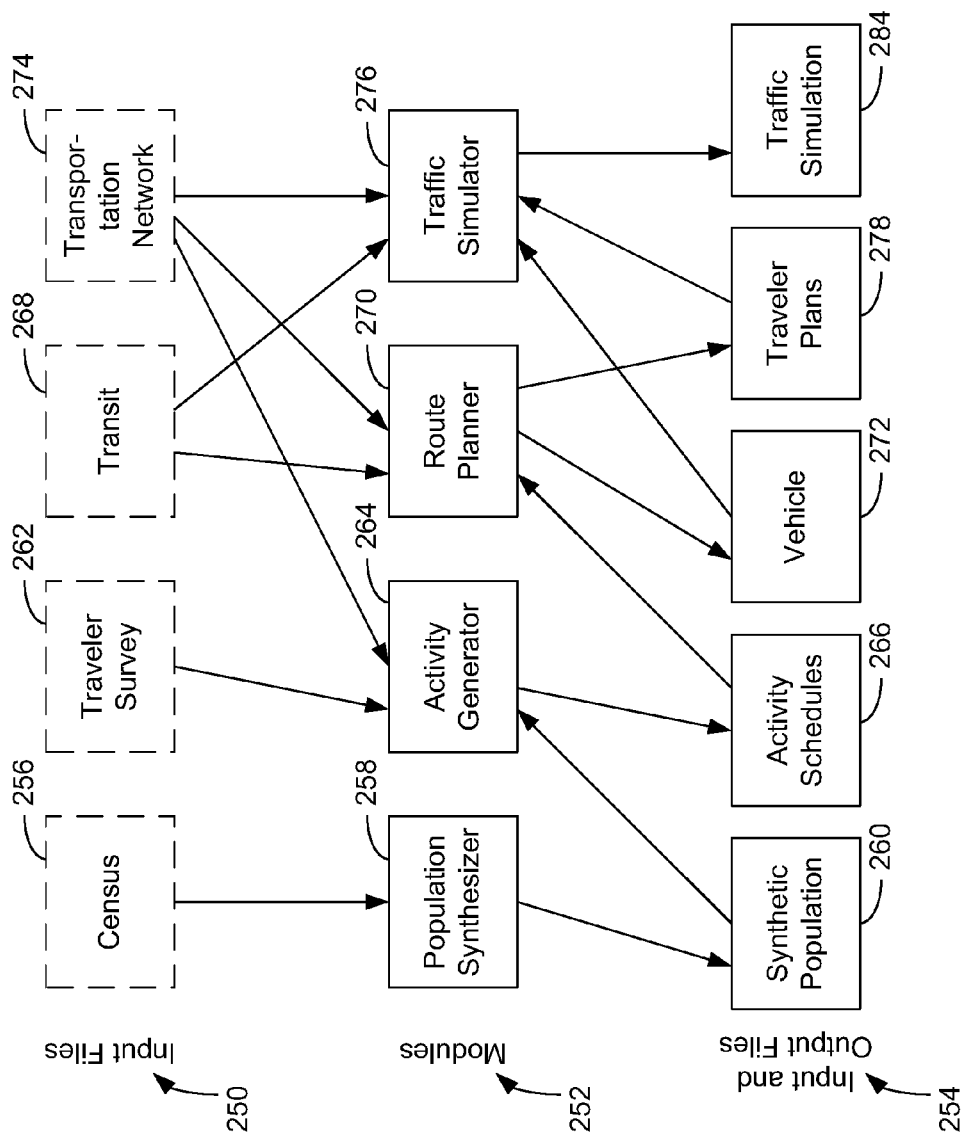
FIG. 2C illustrates an example of the flow of information described in FIGS. 2A and 2B using the situation analysis system, according to an exemplary embodiment.

Referring now to FIG. 2C, an example of the flow of information described in FIGS. 2A and 2B using system 102 is shown, according to an exemplary embodiment. The example shown in FIG. 2C is a possible flow of information to create a synthetic data set. FIG. 2C illustrates several exemplary input data sets 250 that may be used by system 102 to construct a synthetic data set, including a synthetic population. FIG. 2C also illustrates several exemplary modules 252 (e.g., software modules) that may be used by system 102 to manipulate the input data sets and integrate the input data into the synthetic data set. Modules 252 may be a part of synthetic data set subsystem 104, case modeling subsystem 110, or other components of system 102. FIG. 2C also illustrates several output data sets 254 that may result from processing performed by modules 252 on input data sets 250. One or more of output data sets 254 may in turn be utilized by various modules 252 to form and/or further modify the synthetic data set. Each of output data sets 254 may be saved as separate data files or as part of the synthetic data set, such that previous experiments directed to similar questions may require fewer calculations to generate the desired situation representation.

In the example shown in FIG. 2C, census data 256 is used by population synthesizer 258 to form a synthetic population 260 for the relevant geographic area. In other embodiments, the data used by population synthesizer 258 to form synthetic population 260 may include marketing surveys, satellite images, and other data. The information included in census data 256 may include demographic data such as income, age, occupation, etc. that may be used by population synthesizer to assign each synthetic entity to a synthetic group or block. For example, synthetic entities representing people may be assigned to synthetic households based on land use data (e.g., value of house, type of house, such as single-family, multi-family, etc.).

Activity generator 264 then uses synthetic population 260 and traveler survey data 262 to form activity schedules 266 for each of the synthetic entities in the synthetic population. Traveler survey data 262 may include surveys conducted by government entities and may include activity participation and travel data for all members of households in the target area. In other embodiments, activity generator 264 may use other data, such as marketing surveys (e.g., commercial surveys conducted by marketing firms), digital device tracking data (e.g., usage data regarding wireless communication devices), and other information to create activity schedules 266. In some embodiments, activity generator 264 may also utilize location information to construct activity schedules 266, such as locations of activities (e.g., including land use and/or employment information). The location information may be included as part of census data 256, traveler survey 262, or one or more other data sources. In various embodiments, activity schedules 266 may be assigned to synthetic entities based on synthetic groups to which the synthetic entities belong. Activity generator 264 is also configured to assign a location to each activity in each activity schedule 266. Locations may be assigned using various methods. One method is to utilize a distance-based distribution that accounts for the reduction in likelihood that an activity location is accurate the further away from an anchor location (e.g., home, work, school, etc.) it is. Locations may be assigned using an iterative process, wherein locations are assigned to activities and compared to the activity time data in the relevant activity schedule 266 to determine if the time needed to travel between locations matches time data reflected in the activity schedule 266. If not, locations may be reassigned iteratively until the time data matches. Synthetic population 260 and activity schedules 266 may be integrated as part of a synthetic data set.

Additional modules are provided in FIG. 2C that are directed to modifying the synthetic data set and/or producing additional output data sets 254. Route planner 270 is configured to receive information from activity schedules 266, transit usage data 268, and transportation network data 274 and generate vehicle data 272 (e.g., vehicle ownership information for each synthetic individual and/or synthetic group) and traveler plans 278 (e.g., information regarding the travel behavior of or travel routes used by each of the synthetic entities in the synthetic population to fulfill the activities reflected in activity surveys 266). According to one embodiment, the transit usage data may include survey data obtained from a publicly available source (e.g., administrative data from a government source) and may include, for example, data regarding transit activity and usage in the relevant geographic area, such as type of transit used, time of day transit is used, average commute time, average delay due to traffic, and other data. Transportation network data 274 may also include data obtained from a publicly available source (e.g., a U.S. Department of Transportation or Bureau of Transportation Statistics database), and the data may include, for example, streets databases, transit density and type information, traffic counts, timing information for traffic lights, vehicle ownership surveys, mode of transportation choice surveys and measurements, etc. Traveler plans 278 produced by route planner 270 may include, for example, vehicle start and finish parking locations, vehicle path through transportation network 274, expected arrival times at activity locations along the path, synthetic entities present in the vehicle at one or more points along the path, transit mode changes (e.g., car to bus), and/or other information. In one embodiment, route planner 270 may be configured to generate traveler plans 278 that may be multi-modal, such that a synthetic entity may use multiple modes of transportation to arrive at various activities reflected in activity survey 266 (e.g., a car to take a child to school, a train to get to and from work, and a car to shop).

Traffic simulator 276 is configured to use information from vehicle data 272, traveler plans 278, transit data 268, and transportation network data 274 to generate a traffic simulation 284 (e.g., a time-dependent simulation of traffic for the relevant geographic area). Traffic simulation 284 may simulate the flow of traffic over the entire range of times reflected in activity surveys 266 or a portion of the time range. In one embodiment, traffic simulator 276 may be configured to simulate traffic on a second-by-second basis. Traffic simulator 276 is configured to generate traffic simulation 284 based on the detailed travel routes reflected in traveler plans 278, which in turn are based in part on activity schedules 266, such that traffic simulation 284 simulates traffic conditions based on transit patterns related to the activities of each synthetic individual reflected in activity schedules 266. Traffic simulator 276 may be configured to check the generated traffic simulation 284 against transit information from transit data 268 and/or transportation network 274 to determine the reasonableness and/or accuracy of the simulation. For example, traffic simulator 276 may check the amount of traffic in a particular area at a particular time reflected in traffic simulation 284 against traffic count information received from transportation network 274. If the values produced using the simulation are not comparable to the corresponding traffic counts for the relevant area, route planner 270 may be configured to generate a different set of traveler plans 278. In one embodiment, the traveler plan generation and traffic simulation process may be repeated until the traffic simulation 284 corresponds to the information from transit data 268 and transportation network 274 within a given (e.g., user-specified) tolerance.

Figure 2D:
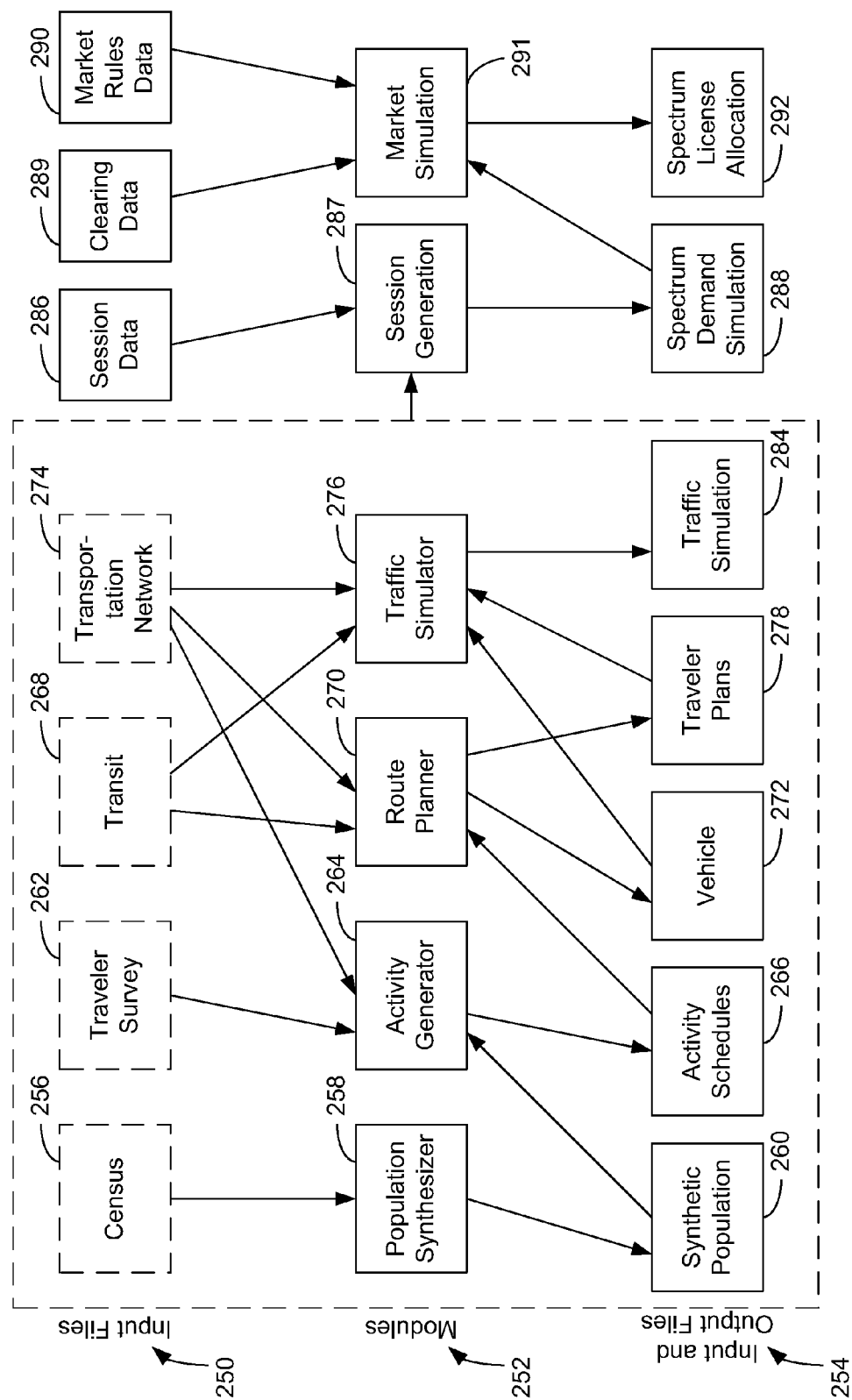
FIG. 2D illustrates an example of the flow of information that may be used to allocate spectrum, according to an exemplary embodiment.

Referring now to FIG. 2D, an exemplary flow of information that may be used to allocate portions of wireless spectrum is shown, according to an exemplary embodiment. As shown, the exemplary embodiment of FIG. 2D is an extension of the exemplary embodiment shown in FIG. 2C. The embodiment shown in FIG. 2D may be used, for example by the Federal Communications Commission ("FCC"), to allocate portions of a limited wireless spectrum, such as the radio frequency spectrum.

Session generation module 287 is configured to generate a time and location-based representation of demand for spectrum. Session generation module 287 is configured to receive session input data 286 and utilize the input data, together with the synthetic data set created by the exemplary embodiment shown in FIG. 2C, to simulate the spectrum demand. Session generation module 287 may receive device ownership data in session input data 286 describing the types of devices owned by members of the target population (e.g., cell phones) and assign devices to entities in the synthetic population based on information (e.g., age, income level, etc.) contained in the device ownership data. In one embodiment, the device ownership data may be a survey such as the National Health Interview Survey collected by the Centers for Disease Control and Prevention. Session input data 286 may also contain data regarding call sessions (e.g., call arrival rate, call duration, etc.) for each cell in the relevant geographic area. A cell may be defined for each tower serving spectrum in the geographic area and may be based on the coverage area of the associated tower. The call session data included in session input data 286 may be aggregated data for each cell. Using the call session data, session generation module 287 may generate and assign call sessions, including times, to entities in the synthetic population. Session input data 286 may also include spatial or geographic data regarding each of the cells in the geographic area, which session generation module 287 may use, together with data from transportation network 274 and/or activity location data from the synthetic data set, to determine call volumes for each service provider's tower in the geographic area. The call volumes may be used by session generation module 287 to generate a simulation of the spectrum demanded at each tower, which is provided in spectrum demand simulation 288.

Market simulation module 291 is configured to utilize the generated spectrum demand simulation 288 to determine a proposed spectrum license allocation 292. Market simulation module 291 may receive input data from clearing data 289. Clearing data 289 may include market clearing mechanism data describing the market clearing mechanism(s) (e.g., auction, dutch auction, ascending bid auction, etc.) used by the supplier to allocate spectrum. Clearing data 289 may also include physical clearing mechanism data describing any physical clearing mechanisms used to address physical limitations to spectrum allocation (e.g., frequency interference between adjacent cells). Market simulation module 291 may also receive information from market rules data 290. Market rules data 290 may include information regarding requirements of one or both of the supplier(s) (e.g., the FCC) and the service provider(s) (e.g., cellular voice and data service providers, radio stations, television stations, etc.) regarding the use of the spectrum. Market simulation module 291 may utilize the spectrum demand simulation 288, clearing data 289, and market rules data 290 to generate a proposed spectrum license allocation 292 that allocates the available spectrum in an efficient manner.

Figure 3:
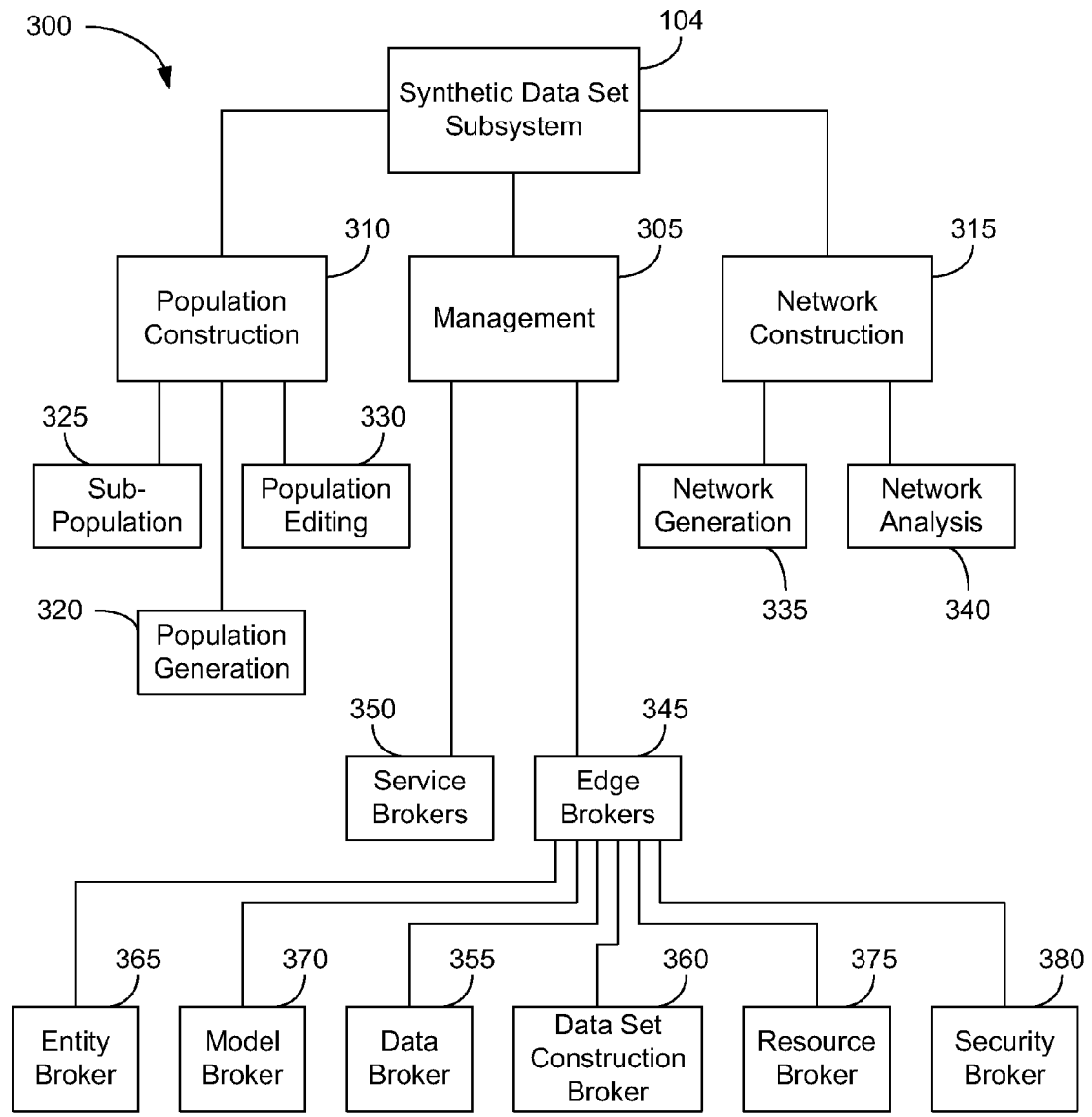
FIG. 3 illustrates a hierarchical block diagram showing components of a synthetic data set subsystem of the situation analysis system, according to an exemplary embodiment.

Referring now to FIG. 3, a hierarchical block diagram 300 illustrating components of synthetic data set subsystem 104 is shown, according to an exemplary embodiment. According to the exemplary embodiment shown in FIG. 3, synthetic data set subsystem 104 includes a management module 305, a population construction module 310, and a network construction module 315. Management module 305 is generally configured to manage the flow of information in synthetic data set subsystem 104 and direct construction of the desired situation representation. Population construction module 310 is configured to construct and/or modify a synthetic population representing entities in a population of interest in creating the desired situation representation. Network construction module 315 is configured to generate a social contact network (e.g., represented as a graph, such as a hypergraph) based on the interactions between synthetic entities in the synthetic population and to measure and analyze the generated network.

Management module 305 is configured to manage the flow of information in synthetic data set subsystem 104 and organize the construction of a synthetic data set for use in creating a desired situation representation. In various embodiments, the use of management module 305 and/or other components of system 102 may be based on the use of service-oriented architectures. Service-oriented architectures provide a flexible set of services that may be used by multiple different kinds of components and applications. Service-oriented architectures allow different components of system 102 to publish their services to other components and applications. The use of service-oriented architectures may provide for improved software reuse and/or scalability of system 102.

In the illustrated exemplary embodiment, management module 305 controls the flow of information through the use of different types of brokers. Brokers are software modules, or agents, that operate with a specific purpose or intent. In some embodiments, the brokers may be algorithmic (i.e., implemented as high level abstractions rather than as ad hoc constructions that are used in grid-based computing systems). The two primary types of brokers utilized to manage the flow of information are edge brokers 345 and service brokers 350. Edge brokers 345 mediate access to a particular resource (e.g., simulation, data, service, etc.) so that resources need not communicate directly with one another. Service brokers 350 receive high-level requests (e.g., a request for data) and spawn any edge brokers 345 needed to service the requests. If information is required to fulfill a request that is not immediately available to an edge broker 345 (e.g., results of a simulation, data from another database, etc.), a new service broker 350 may be spawned to produce the required information. Multiple service brokers 350 may collaborate to solve a larger problem requiring the utilization of a variety of resources. In some embodiments, service brokers 350 may also provide a resource discovery function, locating resources needed to fulfill a request (e.g., data, resources, models or simulations, etc.).

In various embodiments, brokers may be used to solve a problem or access resources that span across many organizations and locations. If all communication occurs between brokers rather than directly between services, users need not have knowledge of the entire problem being addressed or be aware of or have access to all resources needed to solve the problem. In some embodiments, by using a trusted third party to host the computation, one user or organization may provide a proprietary model that uses proprietary data from a second party without either organization needing to have a trust relationship with the other.

Edge brokers 345 and service brokers 350 may have a number of components. Both edge brokers 345 and service brokers 350 may have an information exchange on which data and requests may be placed for sharing with other brokers and/or applications. An information exchange accepts requests for service and offers the service. If a preexisting edge broker 345 is capable of fulfilling the request, that edge broker 345 may offer to fulfill the request and may be selected by the information exchange. If no preexisting edge broker 345 offers to fulfill the request, one or more new brokers may be spawned to fulfill the request. The spawned, or child, broker (e.g., an edge broker) obtains specifications for the required information from the information exchange of the parent broker (e.g., a service broker), and returns results by writing to the parent broker's information exchange. The information exchange of an edge broker 345 allows data and requests to be shared among all applications served by the edge broker 345. The information exchange of a service broker 350 may be shared among all edge brokers 345 connected to the service broker 350, such that all connected edge brokers 345 can directly share information via the information exchange of service broker 350.

Edge brokers 345 may also have additional components. Edge brokers 345 may have an edge broker interface that provides a universal interface for querying and using the services and/or applications that are made available through the edge brokers 345. Edge brokers 345 may also have a service wrapper that allows legacy applications to be used within the framework of management module 305 by taking requests from the information exchange, formatting them in a way that the application can understand, requesting computational resources, running the application using the resources, gathering the results of the application, and making the results available on the information exchange. Edge brokers 345 may further include a service translator that allows applications that are not able to access the information exchange to be used within the framework of management module 305 by translating requests from the information exchange into service calls and placing the results of the service calls on the information exchange. Further, edge brokers 345 may include one or more user interfaces configured to provide direct access (e.g., user access) to the applications served by the broker. The user interfaces may be specific to the purpose of the broker or associated applications. In some embodiments, user interfaces may be provided for some edge brokers 345 and not provided for others.

Figure 4A:
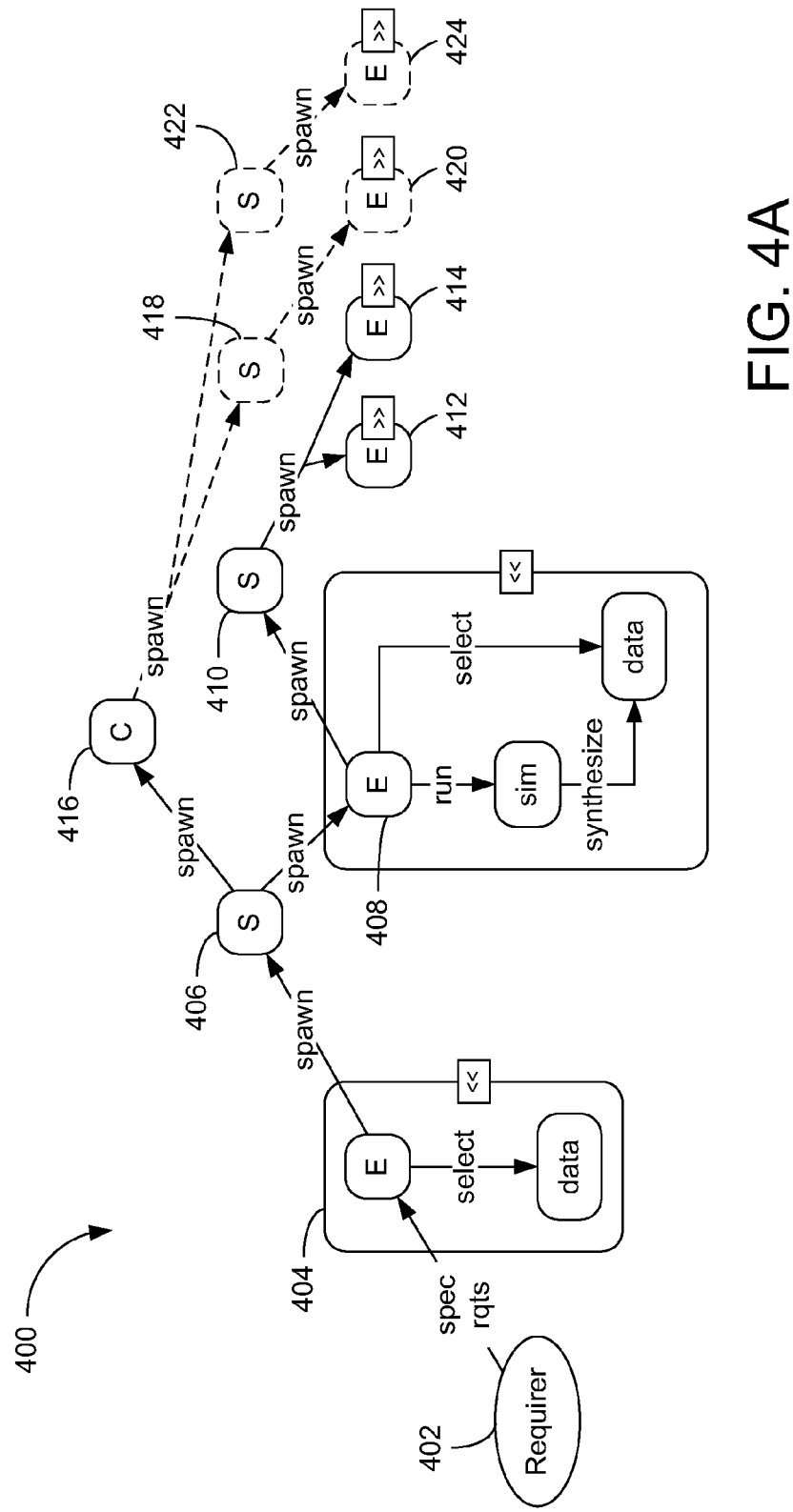
FIG. 4A illustrates a flow diagram showing an exemplary data retrieval and broker spawning process that may be performed by the synthetic data set subsystem, according to an exemplary embodiment.

Referring now to FIG. 4A, a flow diagram illustrating an exemplary data retrieval and broker spawning process 400 is shown, according to an exemplary embodiment. In an initial step, a request is made (e.g., for access to particular data) by a requirer 402. An edge broker 404 responds to the request and collects certain data relevant to the request that it is able to access. Edge broker 404 determines that it is unable to access certain information required to complete the request and spawns service broker 406 to retrieve the required information that it is unable to access. Service broker 406 spawns an edge broker 408 to run a simulation needed to complete the request. In order to run the simulation, edge broker 408 requires information from sources to which it does not have access and, accordingly, edge broker 408 spawns service broker 410 to retrieve the needed information. Service broker 410 in turn spawns edge brokers 412 and 414 to collect the information and write it to the information exchange of service broker 410.

In addition to the simulation results provided by edge broker 408, service broker 406 determines that additional data is needed to complete the request. In some embodiments, management module 305 may include coordination brokers that may spawn one or more service brokers and provide even higher-level coordination than service brokers for fulfilling requests. In the example shown in FIG. 4A, service broker 406 spawns a coordination broker 416, which in turn spawns two service brokers 418 and 422 to collect the required information. Service brokers 418 and 422 spawn edge brokers 420 and 424, respectively, to retrieve the remaining information.

Figure 4B:
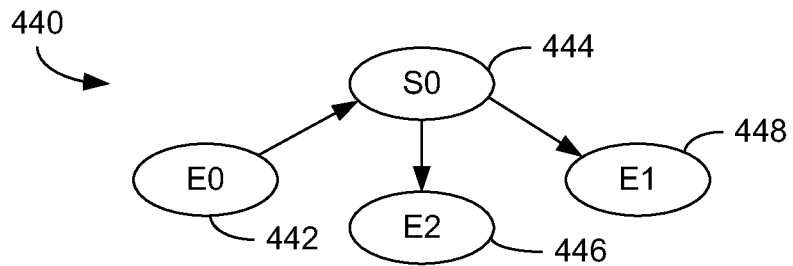
FIGS. 4B through 4D illustrate three example broker structures showing different ways the synthetic data set subsystem may partition information using brokers, according to an exemplary embodiment.
Figure 4C:
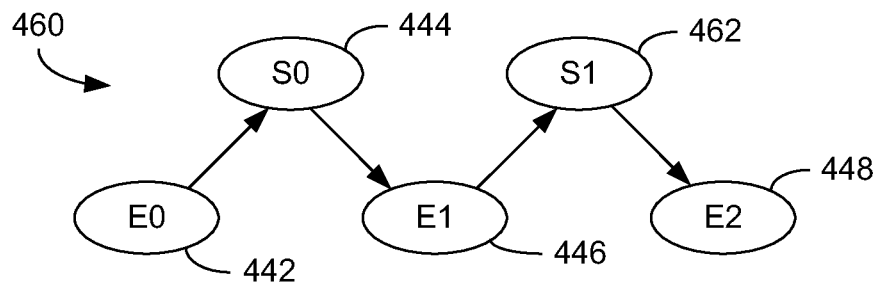
Figure 4D:
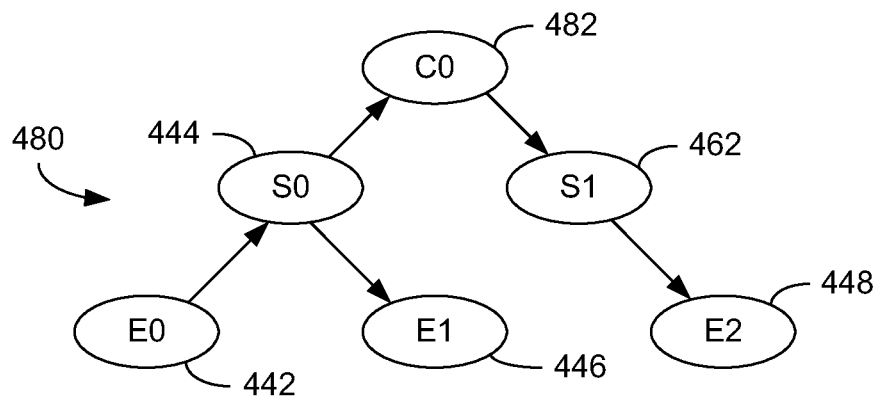

Referring now to FIGS. 4B through 4D, three example broker structures illustrating different ways of partitioning information using brokers are shown, according to exemplary embodiments. In the exemplary structure 440 shown in FIG. 4B, an edge broker 442 spawns a service broker 444, which in turn spawns two edge brokers 446 and 448. Service broker 444 is the parent of edge brokers 446 and 448 and has access to all the information resources available to edge brokers 446 and 448. The exemplary structure 460 shown in FIG. 4C includes the same edge brokers 442, 446, and 448 and service broker 444 as in structure 440 and also includes a service broker 462. However, in structure 460 service broker 444 is only the parent of edge broker 446. Edge broker 446 spawns service broker 462, which in turn spawns edge broker 448. In structure 460, service broker 462 has access to all the information resources available to edge broker 446 but does not have access to the information resources of edge broker 448. Service broker 462, the parent of edge broker 448 in structure 460, has access to the information resources of edge broker 448. The exemplary structure 480 shown in FIG. 4D includes the same brokers as in FIG. 4C and also includes a coordination broker 482. Service broker 444 spawns edge broker 446 and also spawns coordination broker 482. Coordination broker 482 spawns service broker 462, which spawns edge broker 448. In structure 480, coordination broker 482 and service broker 462 have access to all of the information resources available to edge broker 448, but service broker 444 does not have access to the information resources available to edge broker 448 except as they may be represented to service broker 444 by coordination broker 482. As can be seen from comparison of structures 440, 460, and 480, access to information resources can be controlled and partitioned in different ways based on the relationship between brokers and how brokers are spawned.

Figure 4E:
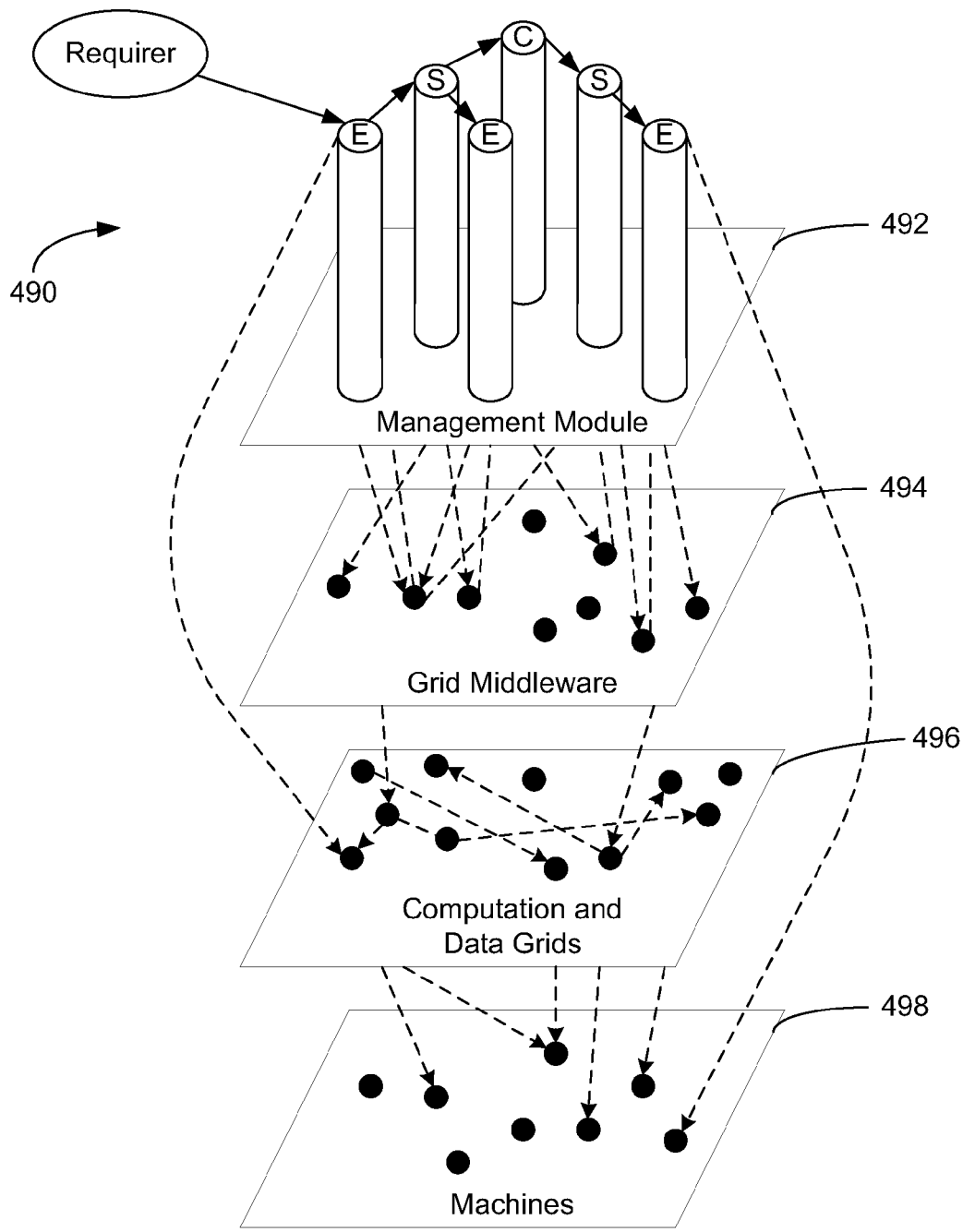
FIG. 4E illustrates a diagram of a control structure relating to a management module of the synthetic data set subsystem, according to an exemplary embodiment.

Referring now to FIG. 4E, a diagram of a control structure 490 relating to management module 305 is shown, according to an exemplary embodiment. Control structure 490 includes a management module level 492, a grid middleware level 494, a computation and data grid level 496, and a machine resource level 498. As shown in control structure 490, edge brokers at management module level 492 interact with grid middleware in grid middleware level 494 to provide access to information resources. Grid middleware utilized by the edge brokers may include Globus, CondorG, Narada, etc. Edge brokers may also interact directly with lower-level resources, such as computational and/or data resources in computation and data grid level 496 or physical machine resources in machine resource level 498.

According to different embodiments, communication can be performed in different ways, depending on the performance needed and the quantity of data to be exchanged. In one embodiment, exchange of data can be mediated completely through levels of brokers, following the interaction paths shown in the examples above. If higher performance is needed, edge brokers connected to the same service broker may be allowed to directly access the service broker's information exchange, allowing data to be placed on or retrieved from the information exchange with no intermediate steps. If higher performance yet is desired, a service address may be communicated between two components and the components may use the service to directly exchange data. The service may be a web service, a communication protocol such as HTTP or FTP, a specialized protocol designed to transfer large amounts of data, or another type of service. The components may use the service to negotiate a communication protocol that they both understand.

Referring again to FIG. 3, management module 305 may also include several types of brokers directed to specific purposes. Management module 305 may include one or more data brokers 355 to manage data utilized by management module 305, including storing, retrieving, organizing, and/or cataloguing the data. Data broker 355 may interact with any broker requiring access to data associated with management module 305. Data broker 355 may offer general interfaces (e.g., where data can be accessed without prior knowledge of data location, organization, storage method, format, etc., such as through using exchanges of metadata with the client) and/or specific interfaces (e.g., an SQL query to a relational database) to access data.

Data broker 355 may include a request component that provides a user interface that can be used to interact with management module 305 data. In one embodiment, the user interface is a graphical user interface provided in a web browser that allows a user to browse, select, modify, and store data. Input may be provided via a form (e.g., an HTML form) submitted via the web browser, and output may include forms submitted back to the user via the web browser and requests submitted to a data service component of data broker 355, discussed below, via the information exchange of data broker 355.

Data broker 355 may also include a data service component that serves as a database-type-specific manager for management module 305 data. The data service component may service both database-independent and database-specific requests. Each data broker 355 may require a separate data service component for each type of database being serviced by the data broker 355. For example, if a data broker 355 is configured to service both relational databases and XML repositories, the data broker may require at least two separate data service component instances. The data service component may receive requests for data, metadata, data updates, etc. and provide response submissions, requested data, metadata, data modifications, etc. Output data may be placed in a database table, placed in a URL, provided directly to a user's web browser, or stored and/or communicated in another way.

Management module 305 may also include one or more data set construction brokers 360 configured to construct and manage input data sets used by management module 305. Data set construction may include at least three phases: (1) identifying data for extraction/modification, (2) for selected data, performing data set-specific construction operations and extracting subsets of the selected data, and (3) for selected data, outputting resultant data sets. The first two phases may be generally applicable to all tasks addressed by data set construction broker 360. In some embodiments, the third phase may be application-specific and may be determined at least in part based on the needs of the desired application.

In some embodiments, data set construction broker 360 may provide interactive and automated capabilities in which new behavior can be acquired by recording and abstracting sequences of interactive operations. First, users may interactively explore available data, extract data, create or modify data operations, develop chained operation sequences, save result data subsets for future use, and/or perform other tasks. Further, scripts may be selected from a catalogued library, automating the data set creation process. Additionally, an automated template generation component may be activated whereby sequences of interactive operations are recorded, aggregated into scripts, parameterized for more general use, and catalogued in a library.

Data set construction broker 360 may include a request component through which a user may interact with and/or manipulate management module 305 input data sets. The request component of data set construction broker 360 may share properties similar to that of data broker 355 (e.g., web browser interface). The request component may also include subcomponents such as a database request subcomponent, a broker-specific request subcomponent, a script request subcomponent, and a data extraction request subcomponent. The database request subcomponent is configured to provide an interface to guide a user through building database-independent requests for data and/or data updates. In some embodiments, the database request subcomponent may utilize database metadata provided through a web browser interface to build the requests. The broker-specific subcomponent is configured to provide data set-specific user interfaces for data set construction (e.g., customized based on the input data, such as transportation-related data, epidemic-related data, etc.). The script request subcomponent is configured to provide control of generation and parameterization of data set construction scripts. The data extraction request subcomponent is configured to work with other subcomponents to facilitate generation of chained sequences of database operations to construct a management module 305 input data set. Data set construction broker 360 may also include a core service component, including subcomponents (e.g., database service, broker-specific service, script service, data extraction service) directed to processing requests received from the subcomponents of the request component of data set construction broker 360.

Management module 305 may further include one or more entity brokers 365 configured to assist in the creation and modification of the synthetic population. Entity broker 365 functions as an edge broker for accessing services of population construction module 310. Entity broker 365 has knowledge of and access to the services of population construction module 310 and publishes those services on its information exchange. Entity broker 365 includes the same components of an edge broker (e.g., information exchange, interface, service translator, service wrapper, etc.) and may also include specialized components for managing interactions between management module 305 and population construction module 310. Greater detail regarding population construction and modification is provided below with reference to the components of population construction module 310.

Management module 305 may include further specialized brokers as needed to perform various functions of management module 305. In various embodiments, management module 305 may include one or more model brokers 370 configured to provide access to models and simulations, one or more resource brokers 375 configured to manage requests for computational resources, and/or one or more security brokers 380 configured to provide security (e.g., authentication and authorization) services within management module 305.

Population construction module 310 is configured to construct and/or modify the synthetic population used by management module 305, network construction module 315 and/or other components of synthetic data set subsystem 104 to create the desired situation representation. The synthetic population includes synthetic entities that may represent entities in a real geographic area (e.g., the United States) or a virtual universe. Each synthetic entity has a set of characteristics or attributes that may be assigned based on information from one or more input data sets (e.g., the U.S. Census). Each synthetic entity may be assigned to one or more subpopulations of the synthetic population (e.g., military unit, factory workers for a specific factory, students or teachers at a specific school, etc.). Further, each synthetic entity may be associated with a sequence of actions that may define what the actions are and where and when the actions occur. The interactions between synthetic entities in the synthetic population may be based at least in part on the activity sequences of the synthetic entities. Population construction module 310 receives requests from management module 305 and responds to the requests through one or more entity brokers. Population construction module 310 may also utilize external data (e.g., received from surveillance subsystem 106) and/or information about the experiment or desired situation representation (e.g., received from management module 305 and/or decision analysis subsystem 108) in constructing and modifying the synthetic population. In one embodiment, all information required to generate the synthetic population may be collected via entity brokers.

Population construction module 310 may include several component modules. Population generation module 320 is configured to generate the synthetic population for use in constructing the desired situation representation. Population generation module 320 may be configured to construct the synthetic population by performing steps shown in FIG. 2B (e.g., steps 222 through 232). External input data used to initially construct the synthetic population (e.g., define the synthetic entities that comprise the synthetic population) may be based upon the type of synthetic population being constructed. For example, synthetic population representing a population of humans may be derived from census data, survey data, etc. Attributes assigned to each synthetic entity may also be based upon the population type. A synthetic human population derived from census or marketing data may be assigned attributes such as age, income, vehicle ownership, gender, education level, etc. A synthetic insect population may be assigned attributes such as genus and genotype. Synthetic entities may be assigned to one or more groups, which may also be dependent upon the type of population. For example, synthetic entities in a synthetic human population may be grouped by household, occupation, communication device ownership, income level, etc. Synthetic entities in a synthetic plant population may be grouped by genetic modification or growth requirements. Synthetic entities in a synthetic insect population may be grouped by resistance to a particular insecticide or probability to transmit a disease.

Population generation module 320 may also assign activity templates and generate activity schedules in a manner similar to that described above with respect to FIG. 2B (e.g., steps 226 through 232). Activity sequence assignments may be made based on attributes of the synthetic entities in the synthetic population, group memberships of the synthetic entities, external data, random assignments, and/or other methods. Activity sequences may provide start times, durations and/or end times, and locations for each of the actions in the sequences. The locations may include geographic coordinates (e.g., an absolute identifier) in a real or virtual coordinate system or a location identifier (e.g., a relative identifier) that has meaning in the universe of the population.

Population editing module 325 is configured to modify and/or add information about synthetic entities in the synthetic population. Requests for modification may be made by management module 305 and conveyed to population editing module 325 by an entity broker. Based on a request, population editing module 325 may select one or more entities or groups from the synthetic population and add or modify attributes of the selected entities or groups. Population editing module 325 may utilize external data and/or scenario information in interpreting the requests and/or modifying the attributes.

Subpopulation module 330 is configured to define subpopulations from the synthetic population and apply modifications to the subpopulations. In some embodiments, synthetic entities may be members of multiple subpopulations. Subpopulation module 330 receives requests for creation or modification of subpopulations from management module 305 via an entity broker and generates a modification plan (e.g., sets of modifications to action sequences, attributes, etc.) that can be executed by management module 305, population construction module 310, and/or other modules of synthetic data set subsystem 104. Scenario information and/or external data may be used to process subpopulation requests and/or produce the modification plan.

In one embodiment, subpopulation module 330 may be configured to modify action sequences associated with one or more subpopulations of synthetic entities. The subpopulation to be modified may be based on a function of the demographics or attributes associated with the synthetic population and/or external data that is specific to the scenario being studied. Demographics may include, for example, income, home location, worker status, susceptibility to disease, etc. Examples of external data may include the probability that entities of a certain demographic class take airline trips or whether a specific plot of land has been sprayed with a pesticide. Once the subpopulation to be modified is identified, replacement activity sequences are identified for the subpopulation. The selected replacement activity sequences may be identified from a set of possible replacement activity sequences based on external data and/or information regarding the scenario being studied. Replacement activity sequences may include activities performed in a city other than a home city, military assignments, withdrawal to home during a pandemic, or other activities. In some embodiments, subpopulation module 330 may be configured to define multiple representations of one or more synthetic entities (e.g., having different attributes and/or activity sequences) and to determine which representation to select based on the external data and/or scenario information.

Figure 5:
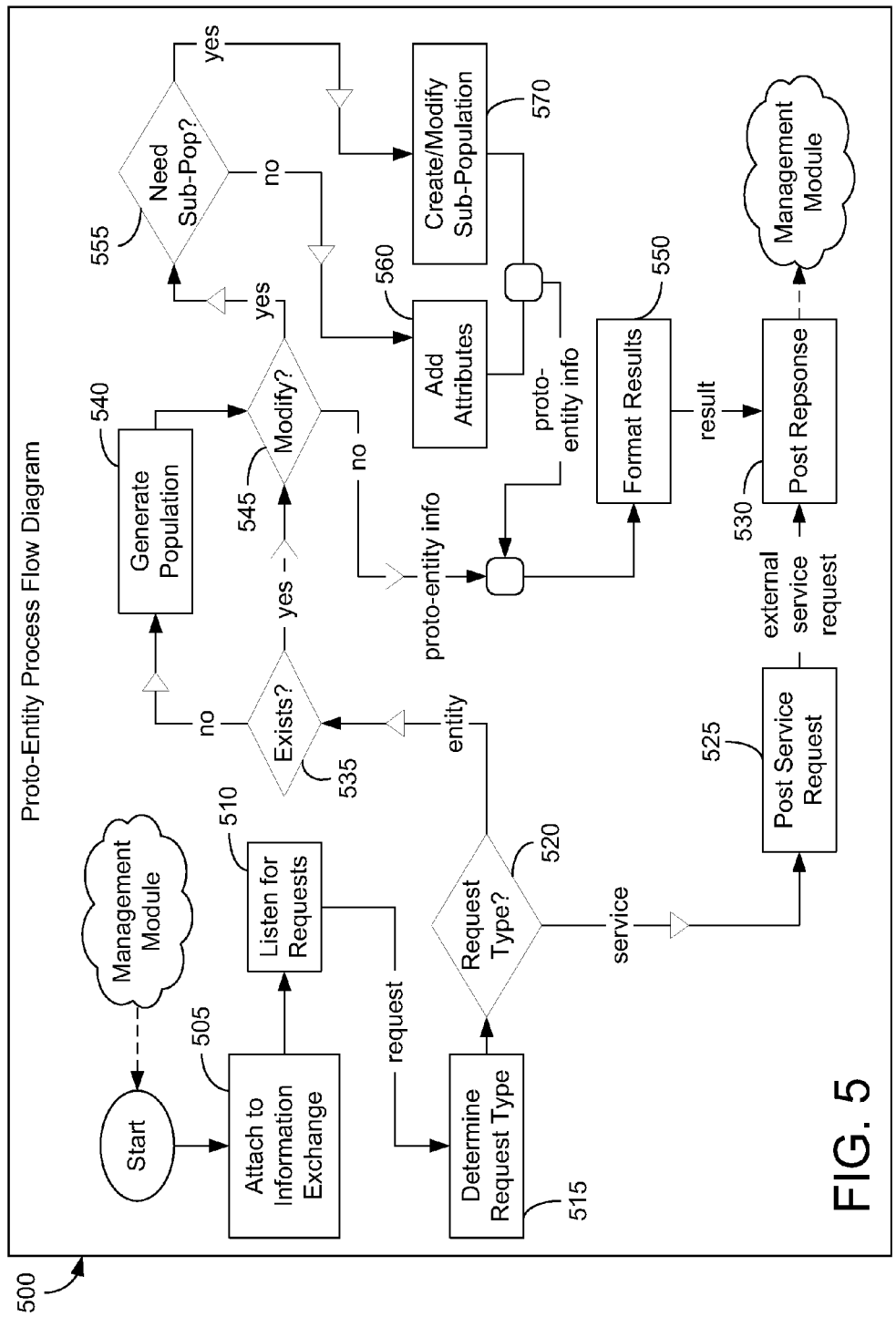
FIG. 5 illustrates a flow diagram for a process that may be used by a population construction module of the synthetic data set subsystem to create and/or modify a synthetic population, according to an exemplary embodiment.

Referring now to FIG. 5, a flow diagram for a process 500 that may be used by population construction module 310 to create and/or modify a synthetic population is shown, according to an exemplary embodiment. Process 500 begins with an entity broker monitoring the information exchange (step 505) and listening for requests (step 510). Once the entity broker receives a request, the type of the request is determined (steps 515 and 520). If the request is for a service not provided by population construction module 310, the entity broker posts the request to the information exchanges (step 525) and responds to management module 305 (step 530).

If the request is an entity request, or a request for a service provided by population construction module 310, it is determined whether the synthetic population and/or synthetic entity associated with the request already exists (step 535). If not, population generation module 320 generates the synthetic population and/or synthetic entity (step 540) and proceeds to step 545. If the synthetic population and/or synthetic entity already exists, process 500 proceeds to step 545. At step 545, it is determined whether the request is to modify the synthetic population. If the request does not include modifying the synthetic population, the desired information about the population is provided and formatted (step 550) and presented to management module 305 (step 530). If the request includes modifying the synthetic population, it is determined whether the creation or modification of a subpopulation has been requested (step 555). If not, population editing module 325 makes any requested changes or additions to the attributes of one or more of the synthetic entities of the synthetic population (step 560), and the entity broker formats the results (step 550) and posts the results to management module 305 (step 530). If the request includes creating or modifying a subpopulation, subpopulation module 330 performs the request subpopulation creation/modification (step 570), and the entity broker formats the results (step 550) and posts the results to management module 305 (step 530).

Referring again to FIG. 3, network construction module 315 is configured to generate a social contact network based on the interactions between synthetic entities in the synthetic population and to measure and analyze the generated network. Network construction module 315 may include a network generation module 335 and a network analysis module 340. Network generation module 335 is configured to generate a social contact network (e.g., represented as a graph such as a hypergraph) based on the interactions between synthetic entities from the synthetic population. The graphs generated by network generation module 335 may be time-dependent or static projections of time-dependent graphs. Each vertex of the graphs represents an entity related to the interactions between entities of the synthetic population and can be linked to attributes, group assignments, actions sequences, and/or other characteristics associated with the entity. Each edge of the graphs represents an interaction between synthetic entities and can be linked to an action from which it is derived. Network generation module 335 may also be configured to translate the desired situation representation into a mathematical specification of the simulation associated with the situation and generate the graph based on the mathematic specification of the simulation. Network generation module 335 may utilize entity brokers and/or other brokers to obtain population information and publish information about the generated graphs.

In one exemplary embodiment, the situation being represented may relate to determining participation in a cellular phone connection. The vertices of the resulting graph may represent people, locations, and cellular towers. Edges may connect all vertices representing people on a particular cellular phone call, locations of those people, and cellular towers involved in the call.

Network analysis module 340 is configured to compute structural measurements on the graphs generated by network generation module 335. Types of measurement methods may include degree distribution, RO-distribution, shortest path distribution, shattering, expansion, betweenness, etc. The measurements performed by network analysis module 340 provide quantitative methods to compare different graphs and, accordingly, different situation representations (e.g., corresponding to different decisions and/or different action choices presented in decision analysis subsystem 108). The measurements may require less computational power than performing a complete simulation and may allow a more efficient understanding of the dynamics of the situation being represented. The measurements performed by network analysis module 340 may be used (e.g., in combination with features of other components of system 102 in some embodiments) to infer statistical and protocol level interactions, rank various (e.g., user-defined) policies in an order, and/or infer any inherent uncertainty in the output.

Figure 6:
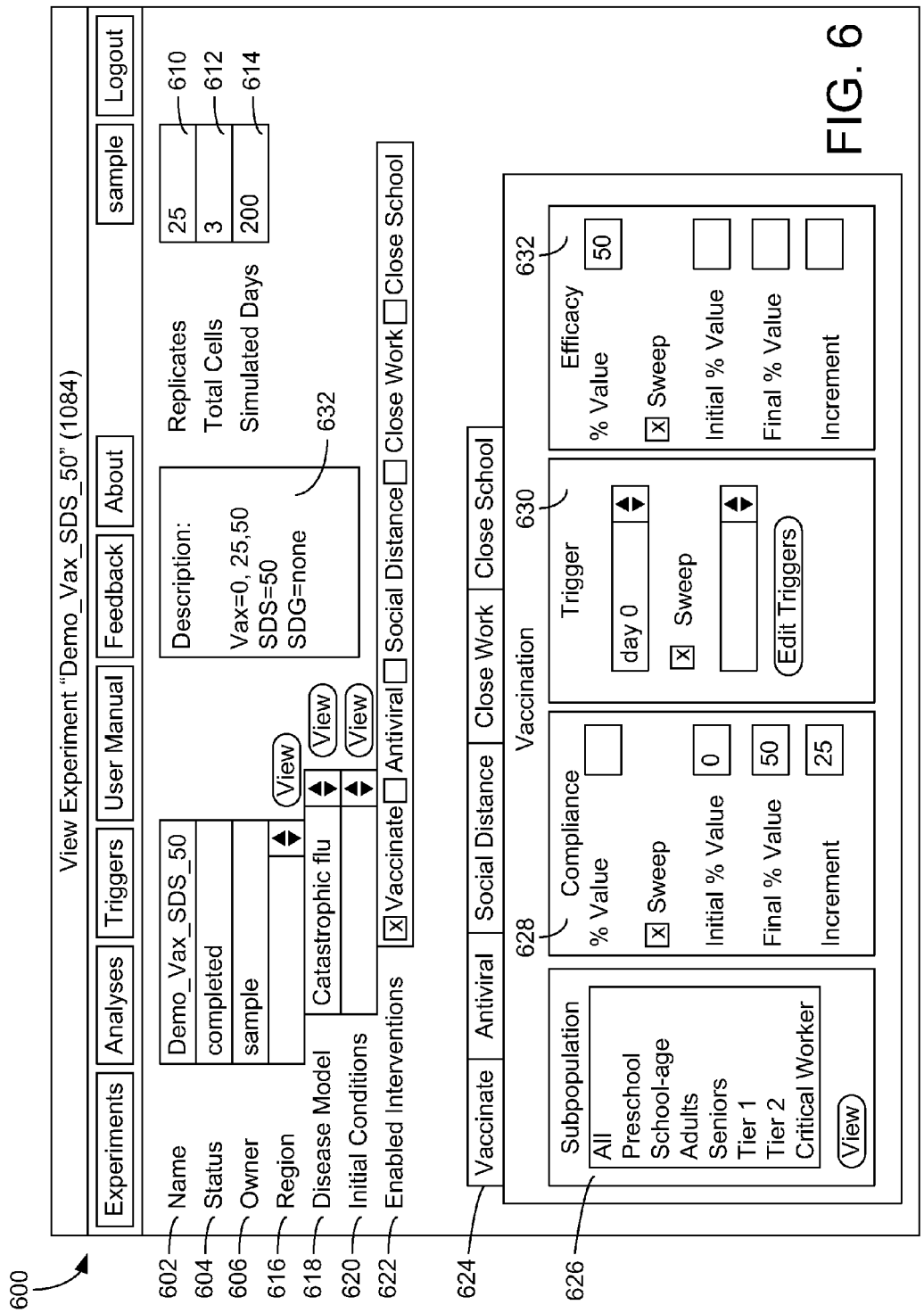
FIG. 6 illustrates a sample user interface that may be utilized by a user to interact with the situation analysis system, according to an exemplary embodiment.

Referring now to FIG. 6, a sample user interface 600 that may be utilized by a user to interact with system 102 is shown, according to an exemplary embodiment. User interface 600 may be one user interface provided with regard to representing the spread of a disease in a particular geographic area. User interface 600 includes several fields that may be used to receive input from the user and/or provide information to the user. Name field 602 allows the user to view and edit the name of the experiment being conducted. Status field 604 presents the current status (e.g., incomplete, completed, etc.) of the experiment. Owner field 606 allows the user to view and edit the owner or creator of the experiment. Description field 608 provides a description of various characteristics of the experiment. Replicate field 610 allows the user to view and edit the number of replicates, or independent computer runs or cycles for a fixed set of input parameters, associated with the experiment. Cell field 612 allows the user to view and edit the number of cells, or scenarios for a specific set of input parameters, associated with the experiment. Time field 614 allows the user to view and edit the amount of time (e.g., number of days) that the experiment covers. Region field 616 permits the user to specify the relevant geographic region for the experiment. Region field 616 may include several predefined geographic regions from which the user can select (e.g., through a drop-down menu). Disease field 618 allows the user to specify the disease or diseases being studied in the experiment. Disease field 618 may include several predefined diseases from which the user can select. Initial conditions field 620 permits the user to select the conditions present at the onset of the experiment and may include several predefined conditions from which the user can select.

Intervention field 622 allows the user to select from one or more available intervention methods to define the methods that are enabled in the experiment. Intervention tabs 624 include tabs for each selected intervention method. In one embodiment, tabs may be displayed for all available intervention methods but only the tabs selected in intervention field 622 may be active. In the displayed exemplary embodiment, the vaccination intervention tab has been selected and a vaccination menu is displayed. The vaccination menu includes a subpopulation field 626 that may be used to select some or all of the subpopulations defined by subpopulation module 330 to receive the defined vaccination intervention. Compliance field 628 allows the user to specify parameters regarding compliance of the selected subpopulation(s) in obtaining vaccinations (e.g., percent of selected entities that obtain vaccination, initial vaccination percentage, final vaccination percentage, etc.). Trigger field 630 allows the user to specify when the vaccination intervention is triggered in the experiment (e.g., the day of the experiment on which the vaccination is provided to the selected subpopulation(s)). Efficacy field 632 permits the user to define how effective the vaccine is in fighting the disease (e.g., percent of selected population for which the vaccine is effective, initial effectiveness, final effectiveness, etc.).

User interface 600 is only one possible interface that may be provided by system 102. A wide variety of options and information may be provided to the user based on the type of experiment being conducted. The user interfaces presented to the user may be modified to include different and/or additional information and options based on the models in case modeling subsystem 110. In some embodiments, users may be permitted to select the level of detail with which to specify the parameters of the experiment (e.g., permit system 102 to define certain parameters of the experiment using default values).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

It should be noted that the orientation of various elements may differ according to other exemplary embodiments, and that such variations are intended to be encompassed by the present disclosure.

It is important to note that the construction and arrangement of elements shown in the various exemplary embodiments is illustrative only. Other substitutions, modifications, changes and omissions may also be made in the design and arrangement of the various exemplary embodiments without departing from the scope of the present disclosure.

The present disclosure contemplates methods, systems and program products on any machine-readable media for accomplishing various operations. The embodiments of the present disclosure may be implemented using existing integrated circuits, computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. In various embodiments, more, less or different steps may be utilized with regard to a particular method without departing from the scope of the present disclosure. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system comprising:
   one or more tangible computer-readable media including computer-executable instructions that are executable by one or more processors to implement a method of generating a representation of a situation, the method comprising:
   receiving input data regarding a target population;
   constructing a synthetic data set including a synthetic population based on the input data, wherein the synthetic population includes a plurality of synthetic entities, wherein each synthetic entity has a one-to-one correspondence with an entity in the target population, wherein each synthetic entity is assigned one or more attributes based on information included in the input data;
   receiving activity data for a plurality of entities in the target population;
   generating activity schedules for each synthetic entity in the synthetic population, wherein each synthetic entity is assigned at least one activity schedule based on the attributes assigned to the synthetic entity and information included in the activity data, wherein an activity schedule describes the activities of the synthetic entity and includes a location associated with each activity;
   receiving additional data relevant to the situation being represented, wherein the additional data is received from at least two distinct information sources;
   modifying the synthetic data set based on the additional data, wherein modifying the synthetic data set includes integrating at least a portion of the additional data received from each of the at least two distinct information sources into the synthetic data set based on one or more behavioral theories related to the synthetic population; and
   generating a social contact network based on the synthetic data set, wherein the social contact network is used to generate the representation of the situation;
   wherein the computer-executable instructions are further executable to implement a synthetic data set subsystem including one or more brokers, wherein the synthetic data set subsystem is configured to carry out the steps of the method, wherein the synthetic data set subsystem is configured to generate a request for a service and the one or more brokers are configured to fulfill the request, and wherein the one or more brokers include one or more edge brokers and one or more service brokers, wherein each edge broker is configured to respond to a request for a service, wherein each edge broker is further configured to spawn a service broker if the edge broker is unable to fulfill the request using resources to which it has access, wherein the spawned service broker is configured to spawn at least one additional edge broker to access resources needed to fulfill the request.

2. The system of claim 1, wherein the method further comprises grouping the synthetic entities into a plurality of synthetic groups, wherein receiving activity data comprises receiving activity data for a plurality of groups in the target population, wherein the at least one activity schedule is assigned to each synthetic entity by matching each synthetic group with activity data for one of the groups in the target population.

3. The system of claim 1, wherein the target population is a population of human beings who reside within a defined geographic area.

4. The system of claim 1, wherein the one or more brokers include at least one of a data broker configured to manage data utilized by the synthetic data set subsystem, a data set construction broker configured to manage at least one of construction and modification of one or more input data sets, and an entity broker configured to manage at least one of creation and modification of the synthetic population.

5. The system of claim 1, wherein generating a social contact network comprises generating a hypergraph representation of interactions between the synthetic entities in the synthetic population, wherein generating the representation of the situation comprises analyzing the generated hypergraph representation.

6. The system of claim 5, wherein the hypergraph representation includes at least ten million nodes.

7. A program product, comprising:
one or more computer-readable media including computer-executable instructions that are executable by one or more processors to implement a method of generating a representation of a situation, the method comprising:
receiving input data regarding a target population;
constructing a synthetic data set including a synthetic population based on the input data, wherein the synthetic population includes a plurality of synthetic entities, wherein each synthetic entity has a one-to-one correspondence with an entity in the target population, wherein each synthetic entity is assigned one or more attributes based on information included in the input data;
receiving activity data for a plurality of entities in the target population;
generating activity schedules for each synthetic entity in the synthetic population, wherein each synthetic entity is assigned at least one activity schedule based on the attributes assigned to the synthetic entity and information included in the activity data, wherein an activity schedule describes the activities of the synthetic entity and includes a location associated with each activity;
receiving additional data relevant to the situation being represented, wherein the additional data is received from at least two distinct information sources;
modifying the synthetic data set based on the additional data, wherein modifying the synthetic data set includes integrating at least a portion of the additional data received from each of the at least two distinct information sources into the synthetic data set based on one or more behavioral theories related to the synthetic population; and
generating a social contact network based on the synthetic data set, wherein the social contact network is used to generate the representation of the situation;
wherein the computer-executable instructions are further executable to implement a synthetic data set subsystem including one or more brokers, wherein the synthetic data set subsystem is configured to carry out the steps of the method, wherein the synthetic data set subsystem is configured to generate a request for a service and the one or more brokers are configured to fulfill the request, and wherein the one or more brokers include one or more edge brokers and one or more service brokers, wherein each edge broker is configured to respond to a request for a service, wherein each edge broker is further configured to spawn a service broker if the edge broker is unable to fulfill the request using resources to which it has access, wherein the spawned service broker is configured to spawn at least one additional edge broker to access resources needed to fulfill the request.

8. The program product of claim 7, wherein the method further comprises grouping the synthetic entities into a plurality of synthetic groups, wherein receiving activity data comprises receiving activity data for a plurality of groups in the target population, wherein the at least one activity schedule is assigned to each synthetic entity by matching each synthetic group with activity data for one of the groups in the target population.

9. The program product of claim 7, wherein the target population is a population of human beings who reside within a defined geographic area.

10. The program product of claim 7, wherein the one or more brokers include at least one of a data broker configured to manage data utilized by the synthetic data set subsystem, a data set construction broker configured to manage at least one of construction and modification of one or more input data sets, and an entity broker configured to manage at least one of creation and modification of the synthetic population.

11. The program product of claim 7, wherein generating a social contact network comprises generating a hypergraph representation of interactions between the synthetic entities in the synthetic population, wherein generating the representation of the situation comprises analyzing the generated hypergraph representation.

12. The program product of claim 11, wherein the hypergraph representation includes at least ten million nodes.

13. A system, comprising:
one or more computer-readable media including computer-executable instructions that are executable by one or more processors to implement one or more software modules, the modules comprising:
a surveillance subsystem configured to receive input data regarding a target population; and
a synthetic data set subsystem configured to construct a synthetic data set including a synthetic population based on the input data, wherein the synthetic population includes a plurality of synthetic entities, wherein each synthetic entity has a one-to-one correspondence with an entity in the target population, wherein each synthetic entity is assigned one or more attributes based on information included in the input data,
wherein the surveillance subsystem is configured to receive activity data for a plurality of entities in the target population,
wherein the synthetic data set subsystem is configured to generate activity schedules for each synthetic entity in the synthetic population, wherein each synthetic entity is assigned at least one activity schedule based on the attributes assigned to the synthetic entity and information included in the activity data, wherein an activity schedule describes the activities of the synthetic entity and includes a location associated with each activity, wherein the surveillance subsystem is configured to receive additional data relevant to the situation being represented, wherein the additional data is received from at least two distinct information sources, wherein the synthetic data set subsystem is configured to modify the synthetic data set based on the additional data, wherein modifying the synthetic data set includes integrating at least a portion of the additional data received from each of the at least two distinct information sources into the synthetic data set based on one or more behavioral theories related to the synthetic population, wherein the synthetic data set subsystem is configured to generate a social contact network based on the synthetic data set, wherein the social contact network is used to generate the representation of the situation, wherein the synthetic data set subsystem comprises one or more brokers, wherein the synthetic data set subsystem is configured to generate a request for a service and the one or more brokers are configured to fulfill the request, and wherein the one or more brokers include one or more edge brokers and one or more service brokers, wherein each edge broker is configured to respond to a request for a service, wherein each edge broker is further configured to spawn a service broker if the edge broker is unable to fulfill the request using resources to which it has access, wherein the spawned service broker is configured to spawn at least one additional edge broker to access resources needed to fulfill the request.

14. The system of claim 13, wherein the synthetic data set subsystem is further configured to group the synthetic entities into a plurality of synthetic groups, wherein the surveillance subsystem is further configured to receive activity data for a plurality of groups in the target population, wherein the synthetic data set subsystem is configured to assign the at least one activity schedule to each synthetic entity by matching each synthetic group with activity data for one of the groups in the target population.

* * * * *